US012331669B2

(12) United States Patent
Zhang et al.

(10) Patent No.: US 12,331,669 B2
(45) Date of Patent: Jun. 17, 2025

(54) METHOD, COMPUTING UNIT, AND COMPUTER PROGRAM FOR DIAGNOSING THE FUNCTIONALITY OF A BURNER

(71) Applicant: Robert Bosch GmbH, Stuttgart (DE)

(72) Inventors: Chao Zhang, Beilstein (DE); Erwin Schiele, Flein (DE); Markus Deissler, Heilbronn (DE); Winfried Langer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 18/170,298

(22) Filed: Feb. 16, 2023

(65) Prior Publication Data

US 2023/0258117 A1 Aug. 17, 2023

(30) Foreign Application Priority Data

Feb. 17, 2022 (DE) ..................... 10 2022 201 665.3

(51) Int. Cl.
*F01N 11/00* (2006.01)
*F01N 3/20* (2006.01)
*G07C 5/08* (2006.01)

(52) U.S. Cl.
CPC .......... *F01N 11/007* (2013.01); *F01N 3/2033* (2013.01); *G07C 5/0808* (2013.01); *G07C 5/0816* (2013.01); *F01N 2550/05* (2013.01)

(58) Field of Classification Search
CPC .... F01N 11/00; F01N 11/007; F01N 2240/14; F01N 2550/00; F01N 2550/05; F01N 2560/025; F01N 2900/0416; F01N 3/025; F01N 3/2033; G07C 5/0808; G07C 5/0816
See application file for complete search history.

(56) References Cited

FOREIGN PATENT DOCUMENTS

| | | | | | |
|---|---|---|---|---|---|
| CA | 2205774 | C | * | 2/2001 | ............. F23N 5/006 |
| DE | 4132814 | A1 | | 4/1993 | |
| DE | 19504208 | A1 | | 8/1995 | |
| DE | 102004038738 | A1 | | 2/2006 | |
| EP | 0827854 | A2 | | 3/1998 | |

* cited by examiner

*Primary Examiner* — Anthony Ayala Delgado
(74) *Attorney, Agent, or Firm* — Michael Best & Friedrich LLP

(57) ABSTRACT

A method (200) for diagnosing the functionality of a burner (100), comprising: determining a lambda value (210) of an exhaust gas of the burner (100), comparing (220) the determined lambda value to a time-based changing lambda threshold (225), and detecting a malfunction (280) when the determined lambda value exceeds the time-based changing lambda threshold (225). Furthermore, a computing unit and a computer program for carrying out such a method (200) are proposed.

9 Claims, 3 Drawing Sheets

METHOD, COMPUTING UNIT, AND COMPUTER PROGRAM FOR DIAGNOSING THE FUNCTIONALITY OF A BURNER

BACKGROUND OF THE INVENTION

The present invention relates to a method for diagnosing the functionality of a burner, in particular a burner in an exhaust gas system of an internal-combustion engine, as well as a computing unit and a computer program for carrying out the method.

To achieve legally prescribed emission limits, three-way catalysts (TWCs) can be used in order to enable a conversion of the relevant gaseous pollutants NOx, HC, and CO into harmless products such as N2, H2O, and CO2. In order for these catalytic reactions to proceed as intended, the temperature in the catalyst usually must exceed the so-called light-off temperature of typically 300-400° C. Once this temperature has been reached or exceeded, the catalytic convertor converts the relevant pollutants almost completely (so-called catalyst temperature threshold).

In order to achieve this state as quickly as possible, so-called internal motor catalyst heat measures can be applied. The efficiency of the gasoline engine is thereby deteriorated by late ignition angles, and the exhaust temperature and enthalpy input into the catalyst is thus increased. With adjusted injection strategies (e.g. multiple injections), the mixture processing can simultaneously be improved, and combustion stability can thus be ensured.

In addition to these engine-internal catalytic heating measures, external catalytic heating measures can also be used, for example, by means of electrically heatable catalysts or fuel-powered burners. Such external heating measures are described, for example, in DE 41 32 814 A1 and DE 195 04 208 A1.

SUMMARY OF THE INVENTION

According to the present invention, a method for diagnosing the functionality of a burner, in particular a burner in an exhaust gas system of an internal-combustion engine, in particular of a motor vehicle, as well as a computing unit and a computer program for carrying out the method, having the features of the independent claims, are proposed. Advantageous configurations are the subject-matter of the subclaims and the following description.

The invention makes use of the measure that a lambda value of an exhaust gas of the burner is determined and compared to a time-based changing lambda threshold. A malfunction of the combustion process is detected when the determined lambda value exceeds the time-based changing lambda threshold, i.e. the exhaust gas contains too many unburned hydrocarbon contents. The fact that robust statements about the flame state within the burner can be made based on the lambda value is exploited: If the burner does not ignite or only ignites with incomplete combustion, the necessary combustion chamber temperature is not reached and unburned hydrocarbons remain in the exhaust gas, whereby the mixture is considered (due to high residual oxygen content) as too lean, typically with a lambda value $\lambda>2$. With stable combustion or combustion stabilizing over time, on the other hand, the measured lambda value decreases over time, so that a lambda value dropping to a target value can be expected in the event of a fault-free burner operation.

The time-based changing lambda threshold decreases in particular as a function of an elapsed time from the operational start (injection and ignition on) of the burner. Thus, the tolerance threshold for determining a malfunction can be tightened according to the typical progression of the lambda value after burner start without causing false-positive evaluations of malfunctions. The time-based changing lambda threshold can be (strictly) monotonous while decreasing. The time-based changing lambda threshold can in particular be predetermined by a number of support points, e.g. in the form of a characteristic map or a characteristic curve, between which it runs linearly. It can also be predetermined functionally, e.g. as a polynomial function or an exponential function. The support sites or coefficients of the function can be determined, for example, on the test bench or can be predetermined empirically.

Advantageously, the method further comprises a determination of a temporal progression of a pressure difference or pressure pulsation in the burner and a detection of a malfunction, when, within a first maximum start time from the operational start of the burner, an amplitude of a fluctuation in the progression does not exceed a first pressure fluctuation amplitude threshold value, and/or when, after a second maximum start time from the operational start of the burner, the amplitude of the fluctuation in the progression exceeds a second pressure fluctuation amplitude threshold (in particular repeatedly or periodically), and/or when the amplitude of the fluctuation in the progression after the end of the first maximum start time from the operational start of the burner falls below a third pressure fluctuation amplitude threshold value (in particular longer than a time debouncing value or permanently). This exploits the fact that the combustion quality is to be evaluated by the pressure fluctuations in the combustion chamber of the catalytic burner: A mass air flow without combustion produces a differential pressure between the burner inlet and the combustion chamber virtually without a pressure vibration, in case of ignition and unstable combustion there are strong pressure fluctuations occur, and in case of stationary combustion, a characteristic low pressure vibration occurs.

In particular, the second maximum start time is longer than the first maximum start time and the second pressure fluctuation amplitude threshold is less than the first pressure fluctuation amplitude threshold, and/or the third pressure fluctuation amplitude threshold is less than the first and/or the second pressure fluctuation amplitude threshold. This takes into account the typical temporal progressions in fault-free burner operation.

The amplitude of the fluctuation in the progression is preferably determined over an interval that is greater than a period duration of a fuel metering to the burner. At least one amplitude is completely detected in each case, which makes the assessment more resilient or robust overall.

Advantageously, the method further comprises the carrying out of a measure when a malfunction is determined. The measure comprises in particular one or more of the group consisting of outputting an alert, restarting the burner, and shutting down the burner. Thus, there can be an adequate response to a detected malfunction so that, in particular when using the burner in exhaust gas systems of internal-combustion engine systems, for example in motor vehicles, emissions-relevant faults can be quickly detected and rectified.

A computing unit according to the invention, e.g. a control unit of a vehicle, is configured, in particular in terms of program technology, so as to carry out a method according to the invention.

The implementation of a method according to the invention in the form of a computer program or computer program product with program code for carrying out all method steps is also advantageous since this results in particularly low costs, in particular if an executing control unit is also used for further tasks and is therefore already present. Lastly, a machine-readable storage medium is provided, on which the computer program is stored as described above. Suitable storage media or data carriers for providing the computer program are in particular magnetic, optical and electrical memories such as hard disks, flash memory, EEPROMs, DVDs, etc. Downloading a program via computer networks (Internet, Intranet, etc.) is possible as well. Such a download can be wired or cabled or wireless (e.g., via a WLAN, a 3G, 4G, 5G or 6G connection, etc.).

BRIEF DESCRIPTION OF THE DRAWINGS

Further advantages and configurations of the invention become apparent from the description and the accompanying drawing.

The invention is shown schematically in the drawing by means of an embodiment example and is described below with reference to the drawing.

DETAILED DESCRIPTION

Figure 1:
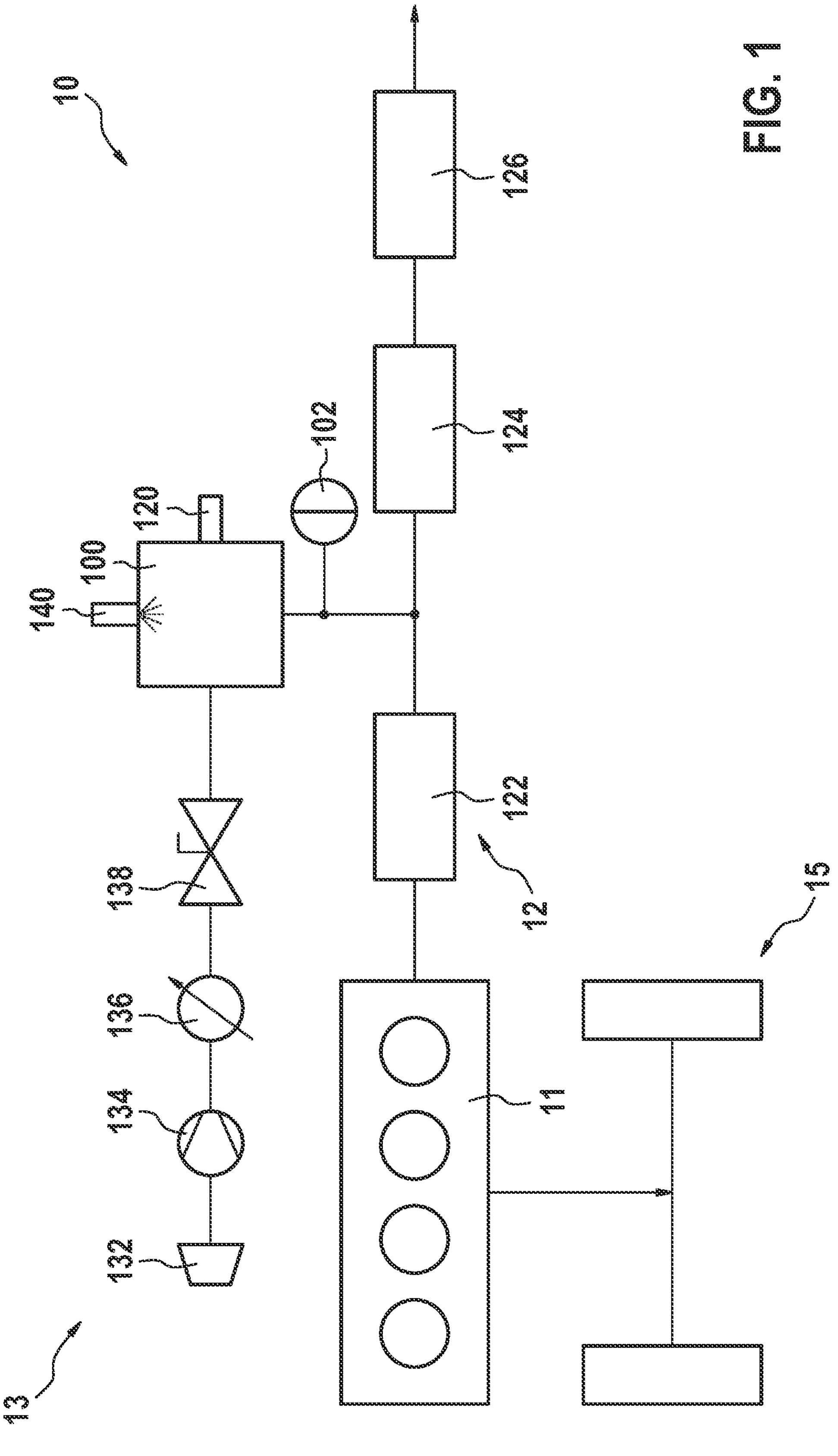
FIG. 1 schematically shows a vehicle in which advantageous configurations of the invention can be applied.

In FIG. 1, a vehicle as can be used in the context of the invention is schematically shown and bears the overall reference number 10. In the example shown, the vehicle 10 comprises an internal-combustion engine 11, for example a stroke or rotary piston engine with external ignition, an exhaust gas system 12, which is adapted for aftertreatment of exhaust produced by the internal-combustion engine 11 and, for this purpose, for example, catalysts 122, 124 and soot particulate filters 126, an exhaust gas burner, for example, the exhaust gas burner 100 shown in FIG. 2, for heating at least a portion of the exhaust gas system 12, as well as a secondary air system 13, which is configured so as to supply air to the exhaust gas system 12 and/or the exhaust gas burner 100, in order to enable or promote oxidation reactions. A lambda sensor 102, for example a broadband lambda sensor, is provided downstream of the exhaust gas burner 100 to determine an oxygen content of the exhaust gas of the exhaust gas burner 100.

The secondary air system 13 herein includes an air filter 132, an air pump 134, a sensor 136, for example, a (differential or absolute) pressure and/or temperature sensor, and a secondary air valve 138, which can be provided, for example, in the form of a blocking valve, and can disrupt or permit the air supply 130 from secondary air system 13 to the exhaust gas burner 100 and the exhaust gas system 12.

It is understood that the components of the vehicle 10 described here need not necessarily be arranged in the order shown herein relative to one another. For example, the sensor 136 can also be located downstream of the valve 138 or upstream of the air pump 134, or the particulate filter 126 can be located upstream of the catalyst 124. Further, it can be advantageous to provide further components or to provide connections between the secondary air system 13 and the exhaust gas system 12 at other points. A differential pressure sensor can also be provided over the air pump 134 and/or over the secondary air valve 138 instead of, or in addition to, a pressure sensor 136.

Figure 2:
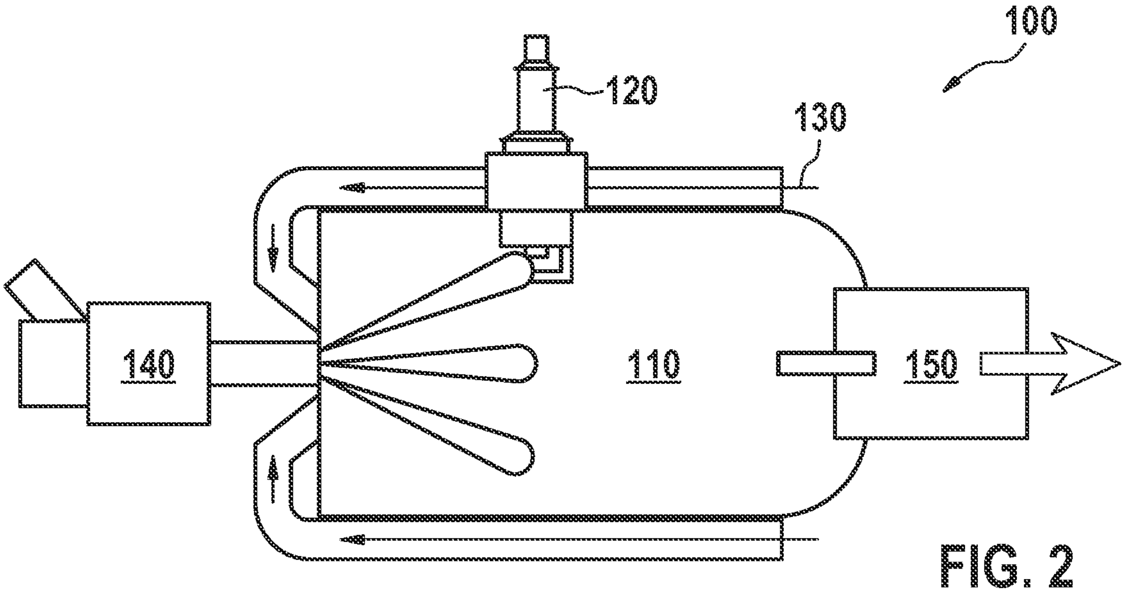
FIG. 2 shows an exhaust gas burner, as can be used in the context of the present invention, in a schematic representation.

In FIG. 2, a burner, for example an exhaust gas burner, with which a method according to the invention can be carried out, is shown schematically and bears the overall reference number 100. The exhaust gas burner 100 comprises a combustion chamber 110, an ignition system 120, here in the form of a spark plug that can be powered by, for example, an ignition coil, an air supply 130 that can be powered by, for example, a secondary air pump, and a fuel supply 140, here in the form of an injection system. Fuel introduced into the combustion chamber 110 during operation of the exhaust gas burner 100 along with introduced air is brought to reaction using the ignition system 120, wherein hot exhaust gases 150 are generated that are used in order to heat components arranged downstream of the exhaust gas burner of an exhaust gas system of an internal-combustion engine, such as catalysts, particulate filters, lambda sensors, or the like. A substantial feature of this design is the direct injection of fuel into the combustion chamber 110 and the associated interaction with the ignition system 120, wherein the invention is not limited to this design principle.

Figure 3:
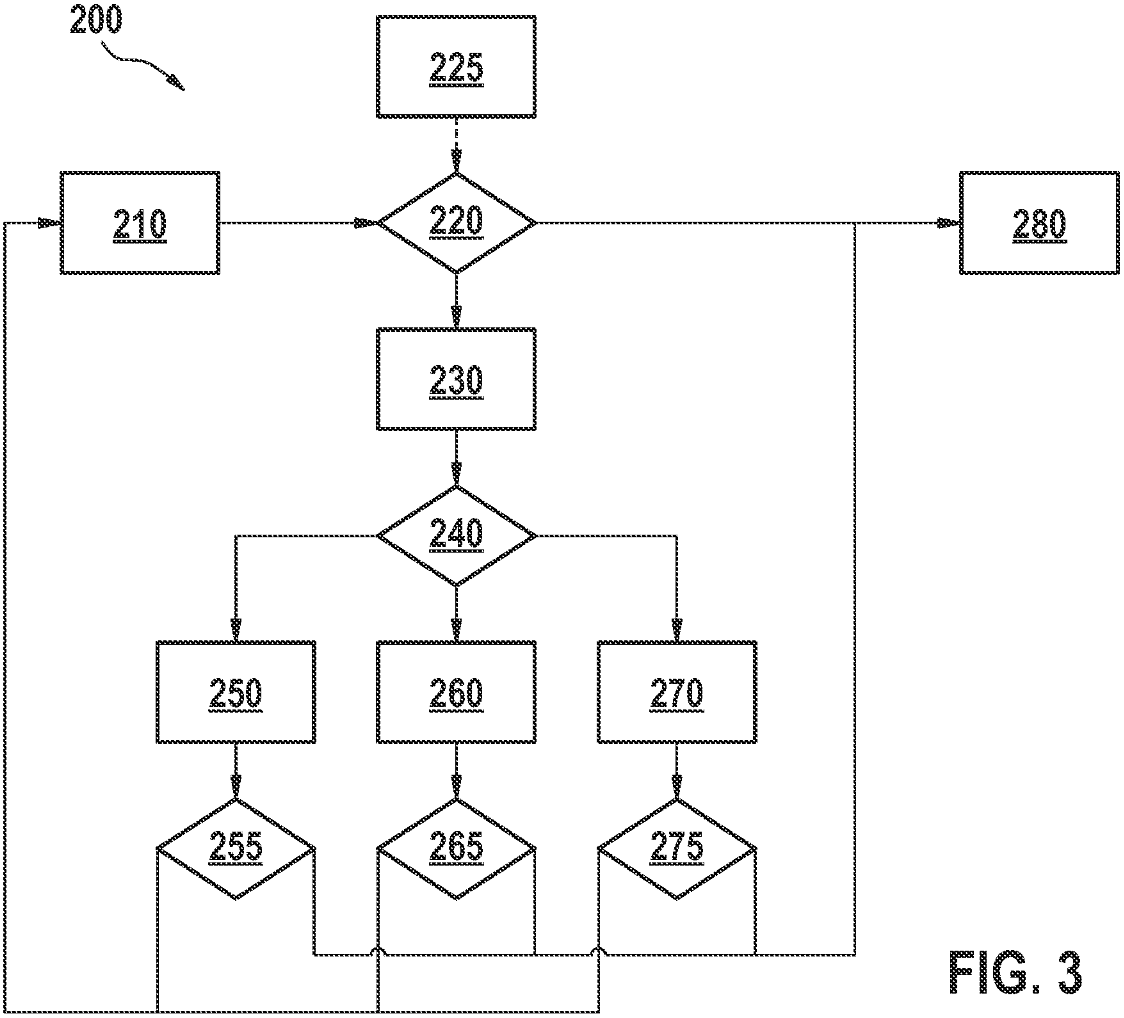
FIG. 3 shows an advantageous configuration of a method according to the invention in the form of a highly simplified block diagram.

In FIG. 3, an advantageous configuration of the invention is shown in the form of a highly simplified block diagram and bears the overall reference number 200.

Figure 4:
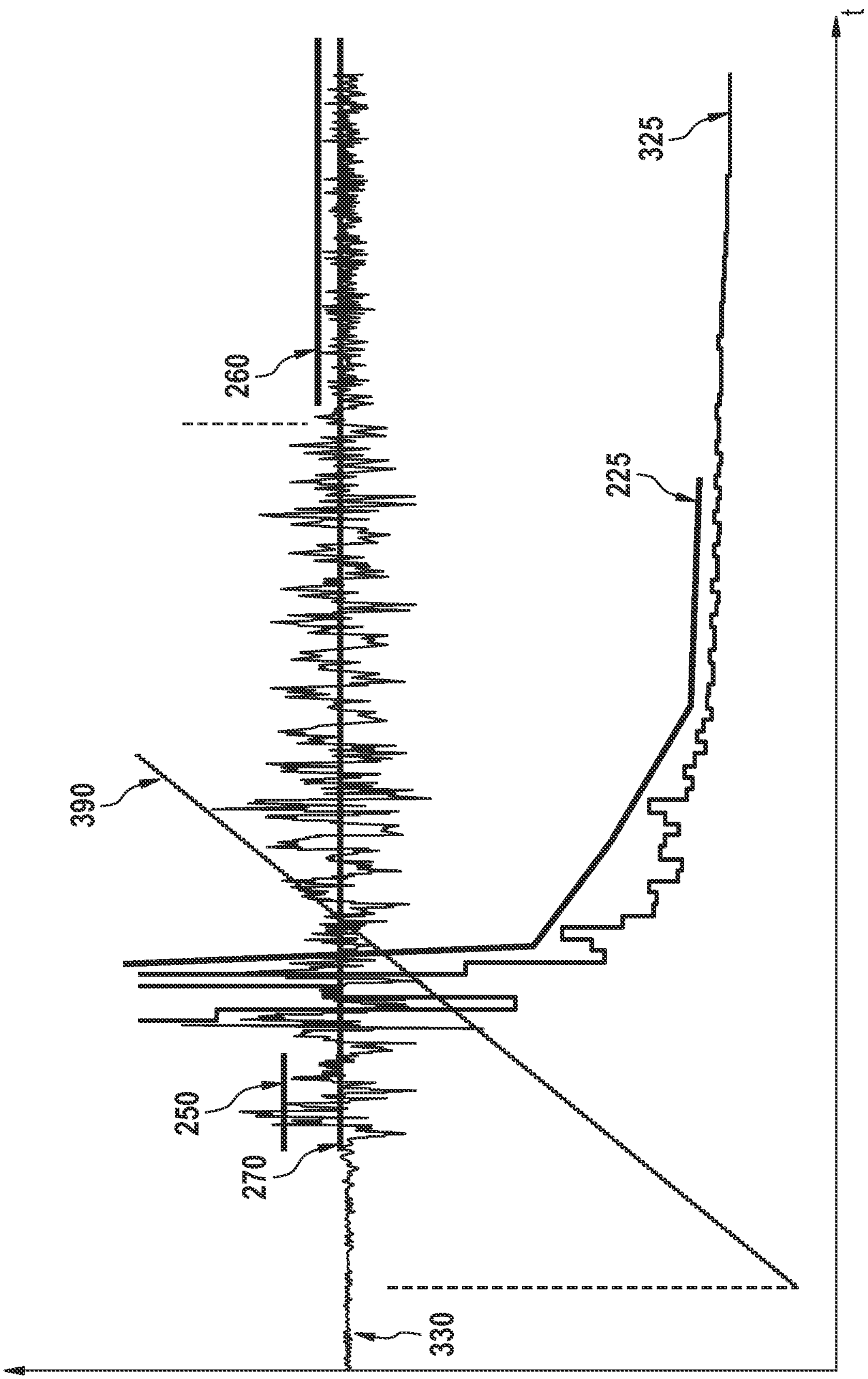
FIG. 4 shows exemplary signal progressions as well as threshold values (progressions) as they can be observed or used in the context of the invention.

In FIG. 4, signal progressions, as can be observed in the context of the invention, as well as associated threshold values (progressions), as can be used in this context, are shown by way of example in a diagram over time t. In the diagram, an accumulated number of fuel meterings to the burner bears the reference number 390. Essentially, this corresponds to a straight line over time, which means (substantially) constant injection intervals, from whose zero value excess time point (injection start of the burner) the time distances to the signal evaluation are measured.

The method 200 determines an operating state of exhaust gas burner 100 based on operating parameters of the internal-combustion engine 11, the exhaust gas system 12, the exhaust gas burner 100, and/or the vehicle 10, whose wheels 15 are driven at least in part using the internal-combustion engine 11. In particular, a signal 325 from the lambda sensor 102 is used, from which it can be easily determined in particular when the burner 100 has a malfunction, i.e., does not ignite, for example, or demonstrates an unstable combustion of fuel.

As already explained above, in the absence of or incomplete combustion of the fuel supplied to the burner 100, a high oxygen content of the exhaust gas of the burner results, which results in a measured lambda value (sensor 102) that is, in particular permanently, too high. With the burner functioning, on the other hand, the lambda value 325 of the burner exhaust gas typically decreases over time to a target, such that a decreasing lambda value 325 indicates a functioning burner 100. This is taken into account in the method 200 such that a lambda threshold is implemented as a time-based changing lambda threshold 225. When the combustion is currently underway, the lambda value 325 of the burner exhaust gas is still so high that, in this phase of operation, a high lambda threshold 225 is acceptable, while as the operating life progresses, this still acceptable lambda threshold 225 is lowered in order to reliably detect malfunctions of the burner 100 without provoking false-positive results of the malfunction evaluation.

Specifically, in the method 200 as shown in FIG. 3, in a first step 210, the current lambda value 325 of the burner exhaust is determined. This is done in particular using the lambda sensor 102 shown in FIG. 1. An exemplary signal progression is, as already mentioned, bears the reference number 325 in FIG. 4.

In a comparison step 220, the resulting determined current lambda value 325 is compared with a threshold lambda value 225, which depends on a time elapsed since the operational start (injection start and ignition) of the burner 100. The currently valid lambda threshold 225 can be determined based on, for example, a time-dependent characteristic, a time-dependent computing instruction, or a reference table.

If, in step 220, it is determined that the current lambda value 325 of the exhaust exceeds the particular lambda threshold 225 and the exhaust gas of the burner thus contains more oxygen than acceptable, then the method 200 detects a malfunction of the burner 100 and proceeds to a step 280 in which a measure is performed, for example, an outputting of an alert.

If, on the other hand, in step 220, it is determined that the determined lambda value does not exceed the respective lambda threshold 225, then the method 200 proceeds to a step 230 in which an amplitude of fluctuations of a pressure signal 330 in the secondary air system 13, in particular a signal of the (differential pressure) sensor 136, is determined. In particular, the amplitude of the fluctuation is determined over an interval that is longer than a period duration of a fuel metering to the burner 100 in order to obtain valid, robust data.

Different pressure fluctuation amplitude threshold values 250, 260, 270 are provided for different time points. Depending on a time elapsed since the operational start of the burner 100, a step 240 is used in order to select which pressure fluctuation amplitude threshold 250, 260, 270 is applicable. Depending on the pressure fluctuation amplitude threshold selected 250, 260, 270, the method proceeds to a respective comparison step 255, 265, 275 in which the amplitude determined in step 230 is compared to the relevant threshold.

Relatively shortly after the operational start of the burner, for example, within the first 0.1 s after the operational start, a high pressure fluctuation amplitude should be detectable by the flame formed in the burner 100, such that, in step 255, if a first pressure fluctuation amplitude threshold value 250 of, for example, 100 hPa is not achieved, it can be assumed that no ignition of the fuel supplied to the burner has occurred and thus a malfunction has been detected. In such a case, the method 200 proceeds to the measure step 280 already discussed. Conversely, if the pressure fluctuation amplitude threshold 250 is reached or exceeded, a successful ignition can be assumed, and the method can return to step 210.

After an extended period of operation, typically after for example 0.2 s, a stabilization of the flame in the burner 100 is to be assumed when operating in accordance with the specification, whereby the pressure fluctuation amplitude should generally decrease and transition to a relatively stable pressure vibration. Thus, in step 265, the amplitude determined in step 230 can be compared to a second pressure fluctuation amplitude threshold 260, which is in particular lower than the first pressure fluctuation amplitude threshold 250. For example, the second pressure fluctuation amplitude threshold value 260 can be 50 hPa.

If the second pressure fluctuation amplitude threshold 260 is exceeded, the flame can be assumed to be burning unstably, and the method can therefore proceed to step 280, because this is a malfunction.

If, on the other hand, step 265 determines that the pressure fluctuation amplitude threshold 260 is met, the method can return to step 210 and continue monitoring.

If an ignition has already been detected in the method 200, it can be determined in the third amplitude comparison step 275 whether the flame has been extinguished again. For this purpose, a third pressure fluctuation amplitude threshold 270 is used, in particular lower than the first and second pressure fluctuation amplitude thresholds 250, 260. For example, the third pressure fluctuation amplitude threshold can be 270 10 Pa or 10 hPa. If this third pressure fluctuation amplitude threshold 270 is undershot, then an extinguishing of the flame must be assumed, so that the method 200 can again proceed to step 280, while an excess of the third pressure fluctuation amplitude threshold 270 indicates the continued burning of a flame, such that the method 200 can return to step 210.

It should be emphasized that the threshold values specified here are to be understood purely by way of example and can be selected appropriately depending on the specific application, for example according to an empirical determination.

A method according to the present invention need not have all of the steps described herein in the order presented herein. For example, it is conceivable and, if appropriate, also advantageous to consolidate some of the steps and/or to perform them in a different order, for example, in reverse order. For example, it can be advantageous to perform the signal evaluation of steps 210 and 230 in a single step. This results on the one hand in a different number of steps and inevitably also in a different order of the steps. Similar modifications to the sequence of the method 200 are also possible with respect to other steps.

The invention claimed is:

1. A method (200) for diagnosing the functionality of a burner (100) in an exhaust gas system of an internal-combustion engine (1) of a motor vehicle, the method comprising:

receiving, at a computing unit, a signal (325) from a lambda sensor in the exhaust gas system, determining, with the computing unit, a lambda value (210) of an exhaust gas of the burner (100) based on the received signal (325), comparing (220), with the computing unit, the determined lambda value to a time- based changing lambda threshold (225), detecting, with the computing unit, a malfunction (280) of the burner when the determined lambda value exceeds the time-based changing lambda threshold (225), and performing a measure with the computing unit when the malfunction is detected (280), wherein the time-based changing lambda threshold (225) decreases as a function of a time elapsed since an operational start of the burner (100), and wherein the measure comprises outputting, with the computing unit, an alert.

2. The method (200) according to claim 1, further comprising:

determining, with the computing unit, a temporal progression of a pressure difference in the burner (100) and a detection of a malfunction (280), when, within a first maximum start time from the operational start of the burner (100), an amplitude of a fluctuation in the progression does not exceed a first pressure fluctuation amplitude threshold value (250), and/or when, after a second maximum start time from the operational start of the burner (100), the amplitude of the fluctuation in the progression exceeds a second pressure fluctuation amplitude threshold (260), and/or when the amplitude of the fluctuation in the progression after the end of the first maximum start time from the operational start of the burner falls below a third pressure fluctuation amplitude threshold value (270).

3. The method (200) according to claim 2, wherein the second maximum start time is longer than the first maximum start time and the second pressure fluctuation amplitude threshold (260) is less than the first pressure fluctuation amplitude threshold (250), and/or wherein the third pressure fluctuation amplitude threshold (270) is less than the first (250), and/or wherein the third pressure fluctuation amplitude threshold (270) is less than the second (260) pressure fluctuation amplitude threshold.

4. The method (200) according to claim 2, wherein the amplitude of the fluctuation in the progression is determined over an interval that is greater than a period duration of a fuel metering to the burner (100).

5. The method (200) according to claim 1, further comprising performing a measure with the computing unit when the malfunction is detected (280).

6. A system comprising:

an exhaust gas system having a burner (100) and a lambda sensor downstream of the burner, and a computing unit configured to:

receive a signal from the lambda sensor, determine a lambda value (210) of an exhaust gas of the burner (100) based on the signal, compare (220) the determined lambda value to a time-based changing lambda threshold (225), detect a malfunction (280) when the determined lambda value exceeds the time- based changing lambda threshold (225), and perform a measure with the computing unit when the malfunction is detected (280), wherein the time-based changing lambda threshold (225) decreases as a function of a time elapsed since an operational start of the burner (100), and wherein the measure comprises outputting, with the computing unit, an alert.

7. A non-transitory computer-readable medium including instructions executable by an electronic processor to perform a set of functions, the set of functions comprising:

receiving a signal from a lambda sensor in an exhaust gas system of an internal combustion engine (11) of a motor vehicle, determining a lambda value (210) of an exhaust gas of a burner (100) within the exhaust gas system based on the received signal, comparing (220) the determined lambda value to a time-based changing lambda threshold (225), and detecting a malfunction (280) when the determined lambda value exceeds the time-based changing lambda threshold (225), and performing a measure with the computing unit when the malfunction is detected (280), wherein the time-based changing lambda threshold (225) decreases as a function of a time elapsed since an operational start of the burner (100), and wherein the measure comprises outputting, with the computing unit, an alert.

8. The method (200) according to claim 1, wherein the measure further comprises restarting the burner (100).

9. The method (200) according to claim 1, wherein the measure further comprises shutting down the burner (100).

* * * * *